US012002025B2

(12) United States Patent
Parker et al.

(10) Patent No.: US 12,002,025 B2
(45) Date of Patent: Jun. 4, 2024

(54) INFORMATION MARKETPLACE SYSTEM INCLUDING A VIDEO MONETIZATION SERVICE AND A SOCIAL NETWORKING PLATFORM

(71) Applicants: Joshua Parker, Bowie, MD (US); Rasheed Murray, Fort Washington, MD (US); Anthony Michael Duncan, Jr., Baltimore, MD (US)

(72) Inventors: Joshua Parker, Bowie, MD (US); Rasheed Murray, Fort Washington, MD (US); Anthony Michael Duncan, Jr., Baltimore, MD (US)

( * ) Notice: Subject to any disclaimer, the term of this patent is extended or adjusted under 35 U.S.C. 154(b) by 0 days.

(21) Appl. No.: 17/319,459

(22) Filed: May 13, 2021

(65) Prior Publication Data

US 2022/0366389 A1  Nov. 17, 2022

(51) Int. Cl.
*G06Q 20/12* (2012.01)
*G06Q 10/1093* (2023.01)
*G06Q 30/04* (2012.01)
*G06Q 50/00* (2012.01)

(52) U.S. Cl.
CPC ....... *G06Q 20/127* (2013.01); *G06Q 10/1093* (2013.01); *G06Q 50/01* (2013.01); *G06Q 30/04* (2013.01)

(58) Field of Classification Search
CPC .. G06Q 20/127; G06Q 10/1093; G06Q 50/01; G06Q 30/04
USPC ...................................................... 705/7.18
See application file for complete search history.

(56) References Cited

U.S. PATENT DOCUMENTS

| | | | | |
|---|---|---|---|---|
| 10,721,499 | B2 * | 7/2020 | Chang | H04N 21/21805 |
| 2008/0120152 | A1 * | 5/2008 | McCrea | G06Q 30/0201 |
| | | | | 705/7.29 |
| 2008/0235112 | A1 * | 9/2008 | Montoya | G06Q 30/02 |
| | | | | 705/26.1 |
| 2009/0327035 | A1 * | 12/2009 | Allard | H04N 21/2668 |
| | | | | 705/7.29 |
| 2011/0055859 | A1 * | 3/2011 | Dasher | H04N 21/63345 |
| | | | | 455/466 |
| 2012/0151514 | A1 * | 6/2012 | Kandanala | H04N 21/4314 |
| | | | | 725/23 |
| 2013/0283319 | A1 * | 10/2013 | Marshall | H04N 21/2743 |
| | | | | 725/61 |
| 2014/0236846 | A1 * | 8/2014 | Melika | H04W 4/50 |
| | | | | 705/310 |
| 2015/0007256 | A1 * | 1/2015 | Kirkeby | G06F 21/10 |
| | | | | 726/1 |
| 2015/0019614 | A1 * | 1/2015 | Pierre-March | H04L 67/60 |
| | | | | 709/201 |
| 2015/0229487 | A1 * | 8/2015 | Lickliter | H04L 12/1854 |
| | | | | 709/203 |
| 2017/0024762 | A1 * | 1/2017 | Swaminathan | G06Q 30/0277 |

(Continued)

*Primary Examiner* — Abdallah A El-Hage Hassan

(57) ABSTRACT

The present disclosure is directed towards implementing a video monetization service into a social networking platform to form an information marketplace, enabling users to monetize information and digital content. A creator of a monetized video session can configure the monetized video session to his/her user preference and invite as many participants, e.g., all associations, a limited group of associations, including just one association, or other social media users in general. The associations may be followers, circles, friends, connections, or any other form of association.

20 Claims, 6 Drawing Sheets

(56) References Cited

U.S. PATENT DOCUMENTS

| | | | |
|---|---|---|---|
| 2017/0091843 A1* | 3/2017 | Zeigler | G06Q 30/0601 |
| 2017/0094332 A1* | 3/2017 | Thomas | H04N 21/4826 |
| 2017/0094361 A1* | 3/2017 | Thomas | G06F 16/252 |
| 2017/0180562 A1* | 6/2017 | Kageyama | H04M 15/07 |
| 2017/0237829 A1* | 8/2017 | Kirkeby | G06Q 20/29 709/219 |
| 2017/0364372 A1* | 12/2017 | Harpur | H04L 65/4015 |
| 2019/0066730 A1* | 2/2019 | Singh | G06F 16/78 |
| 2019/0075340 A1* | 3/2019 | Hochart | H04N 21/4882 |
| 2019/0114603 A1* | 4/2019 | Sharma | H04N 21/44204 |
| 2020/0258061 A1* | 8/2020 | Beadles | H04L 63/102 |
| 2021/0082017 A1* | 3/2021 | Farrow | G06Q 30/0619 |
| 2021/0149943 A1* | 5/2021 | Hoy | G06F 16/444 |
| 2021/0241304 A1* | 8/2021 | Benkreira | G06Q 30/0215 |
| 2022/0058697 A1* | 2/2022 | Kang | G06F 9/5027 |
| 2022/0210514 A1* | 6/2022 | McBeth | H04N 21/854 |

* cited by examiner

INFORMATION MARKETPLACE SYSTEM INCLUDING A VIDEO MONETIZATION SERVICE AND A SOCIAL NETWORKING PLATFORM

BACKGROUND

Social networking services are typically web-based and organized around user profiles and/or collections of content accessible by members of the network. Membership in such social networks is comprised of individuals, or groupings of individuals, who are generally represented by profile pages and permitted to interact as determined by the social networking service.

In many popular social networking services, especially profile-focused platforms, activity centers on web pages or social spaces that enable members to view profiles, communicate and share activities, interests, opinions, status updates, audio/video content, etc., across networks of contacts. Real-time messaging platforms might also allow members to track certain activities of other members of the platform, create and consume content.

Individual members connect to social networking services through existing web-based platforms via a computing device, tablet or smartphone. Members often share a common bond, social status, or geographic or cultural connection with their respective contacts. Smartphone and games-based mobile social networking services are examples of rapidly developing areas.

As social media driven content becomes more and more popular, users are creating monetizable video content. In recent decades, advertising has been the most common video monetization method on the internet by far. An example of this would be the ads you tend to skip before a YouTube video. According to a Digital TV Research report, advertising revenue will reach $47 billion by 2023.

Unfortunately, viewers don't enjoy being followed around by advertisements. Many don't want to have to watch a 30-second ad before a video and they've become more inclined to pay for a subscription to eliminate these types of ads. Those who haven't started paying for a subscription are using ad blockers to avoid having to see these advertisements altogether. Today, ad blockers block around 40% of online ads.

DETAILED DESCRIPTION

Figure 1:
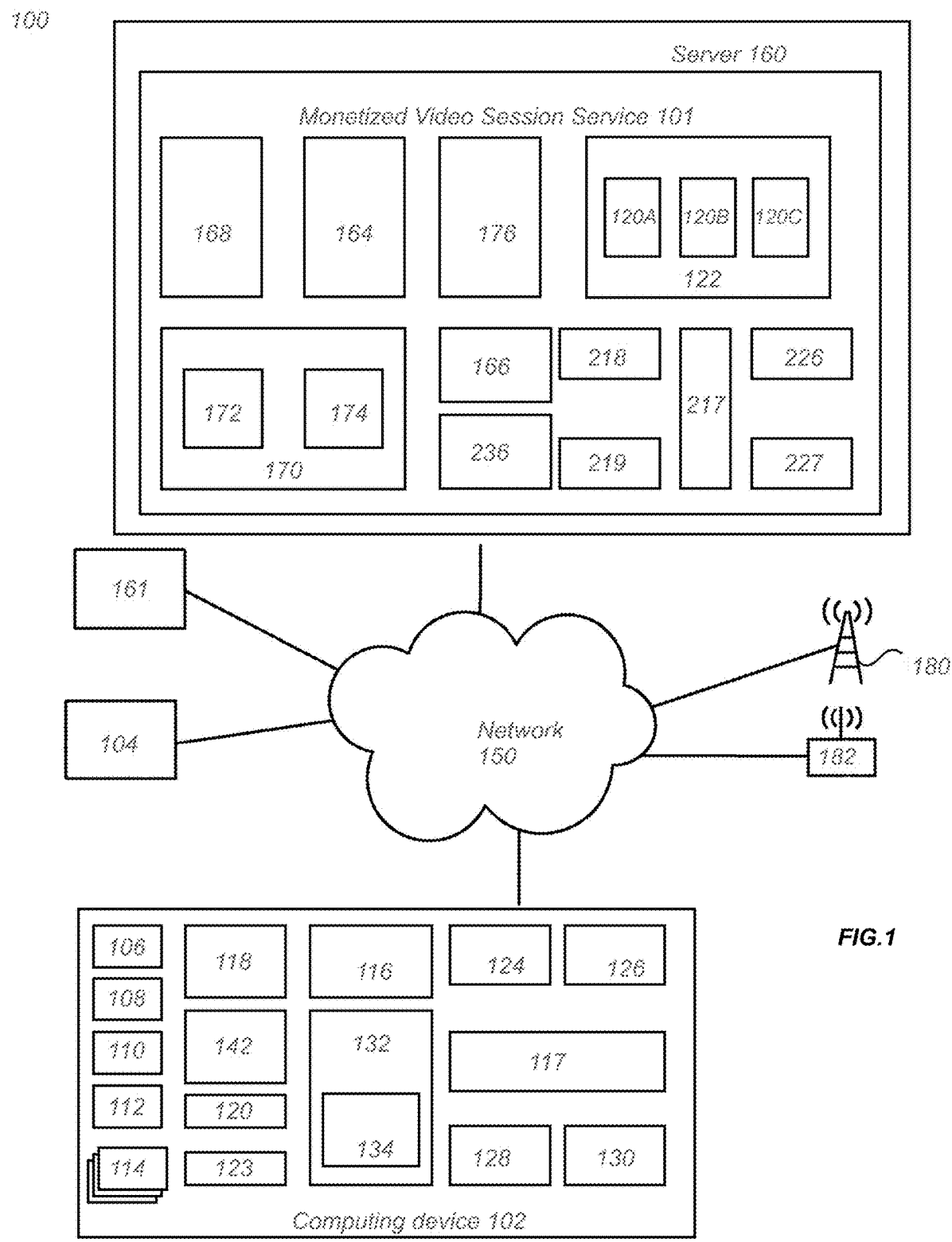
FIG. 1 illustrates an example system configured to support a monetized video configuration service for sharing monetized video session streams among users over a network according to an example.

Users attempt to monetize a social media following by linking disparate systems, a video streaming service and a paywall service. Unfortunately, there are a few potential drawbacks to using disparate systems. For example, integration between both platforms is most ideal, so the ability to integrate external applications with your online video platform (OVP) is essential. Using a third-party paywall requires a second subscription (in addition to the OVP).

The present disclosure is directed towards implementing a video monetization service into a social networking platform to form an information marketplace system, enabling users to monetize information and digital content. A creator of a monetized video session can configure the monetized video session to his/her user preference and invite as many participants, e.g., all associations, a limited group of associations, including just one association, or other social media users in general. The associations may be followers, circles, friends, connections, or any other form of association.

A selection of participants in a monetized video session can be made programmatically, manually, or both programmatically and manually, based on one or more connection graphs of the platform. The session creator may configure a paywall that specifies a threshold value for admission to the monetized video session. Other administrative functions may be configurable by the monetized video session creator. For example, the session creator may indicate the number of users who may participate upon satisfying the threshold value at the paywall. The session creator may also indicate a number of participants who may participate without having satisfied the threshold value at the paywall. Participants who may participate without having satisfied the threshold value may be admitted based on profile characteristics or based on first come first served.

The participants may select the monetized video session from a selection of other monetized videos sessions, where upon selecting the monetized video session the participant is directed to a user interface for the session. As described below, the user interface for the session may include information related to the session, as well as a paywall access point. The participants may execute a transaction at the paywall access point on their terminal device to satisfy the established threshold value. The monetized video creator may use a camera on the monetized video session creator's terminal device (or a camera-equipped device connected to the terminal device). The terminal device may display a user interface that allows the session creator to stream real-time video and/or stream video playback to a social media server supporting a video monetized video session service. For example, the session creator may configure the monetized video session to stream video playback of a digital asset that is associated with a non-fungible token (NFT) that is owned or licensed to the session creator. Moreover, the creator may configure the monetized video session to stream video playback of a digital file otherwise owned, licensed, or authorized to the session creator.

The session creator's terminal device may continually (e.g., at regular periods during the monetized video session) determine the throughput for the monetized video session and adjust the video quality. The social media server may make the monetized video session available to other social media users. Thus, the social media server provides a shared monetized video session generated by a user without specialized equipment or networks.

In some embodiments, the monetized video session may include a closed feedback loop in which engagements from participants are provided to the session creator and to other participants in real time. For example, a participant may comment on the monetized videos session, may signal approval for specific moments in the monetized videos session, and/or may invite other social media users to join the monetized video session via the user interface for the session.

Such engagements may be provided back to participants and the session creator within a latency period (e.g., two seconds or less) suitable to allow the session creator to react to and interact with the participants. The session creator, for example, may decide to continue the monetized video session when the monetized video session is popular as suggested by the number of participants, by a high level of engagements, viewer comments, other feedback, and/or by the identity of one or more participants. Optionally, the session creator may change one or more aspects of the monetized video session based on these or similar information. Examples of the disclosed embodiments enable a participant to signal approval throughout the monetized videos session, rather than just one time. The social media server may provide representations of these activities to all participants in the monetized videos session. Thus, the session creator and anyone viewing the monetized video session may see the comments posted and indications of approval from any viewer. In other words, the engagements form a closed feedback loop with the session creator and other participants.

When a monetized video session ends, the social media server may store the monetized video session in a digital video file format. In some examples, the monetized video session can be stored for a limited period of time, e.g., 2 hours, 24 hours, one week, one moth, etc., or, alternatively, may be stored indefinitely. Future replay participants may replay the saved monetized video session and may see the comments, approvals, and notification messages at the same time in the monetized video session that live participants also saw these elements. In some example embodiments, the replay viewer may add additional appreciation signals and/or comments. The system may optionally keep metadata for a monetized video session and/or the session creator, so that popular monetized videos sessions and popular session creators can be identified. In addition, techniques, methods, and systems are disclosed herein for supporting one or more enhanced features and functions of a monetized videos configuration service. For example, the monetized video session service may select shortened clips or video summaries (replays) that capture past key activities of the monetized videos session. These replays may be provided to participants who did not begin join the session until after the past key activities occurred, may be provided on the session creator's profile page for marketing, or may be provided on a user interface of a subsequent session. After the monetized video session has ended, these replays (in addition to the full monetized videos session) may be aggregated (e.g., chronologically) and stored as one or more networked accessible videos so that replay participants may be able to view the key activities rather than the full session. Optionally, the clips may be programmatically selected based on any type and any combination of available information suitable for detecting the occurrence of key activities. For example, indications of viewer interest, viewer engagement, and popularity with participants may be used to programmatically select the clips.

An example measure of a participant interest is impression. Example measures of viewer engagement include standardized ideogrammatic icons, comments, and reposts of another participant's post. Example measures of popularity include session creator identity, participant identity, impression, and reposts of the creator's/participant's/ or another participant's post. (The respective machine learning models for interest, engagement, and popularity may use common information.) Clips may be programmatically selected when the measures of interest, engagement, and popularity reach a threshold level suggesting a reasonable likelihood of an occurrence of a key activity. Parameters of machine learning models and the threshold are adjusted to improve accuracy.

In some examples, the system may include one or more of the following features (or any combination thereof). The monetized video session service may also include a video editor configured to edit a recorded monetized video session video stream to create a replay, where the replay is a shorter version of the recorded monetized video session video stream. In some embodiments, the video editor may be configured to automatically create the replay from the monetized video session video stream based on user engagements with various portions of the monetized video session video stream. The video editor may be configured to automatically create the replay to have two or more video clips relating to portions of the monetized video session video stream having a level of user engagements equal to or above a threshold level. Alternatively, the session creator may be provided a producer dashboard, over the network, to enable editing of the monetized video session video stream.

In an embodiment where the session creator elects to participate in an advertising program in which the creator permits advertisers to place ad content within the monetized videos session, the popularity rating for the session creator, and/or other ratings based on the described feedback, and/or other sort of information the session creator wants to provide to advertisers (e.g., tags describing events being streamed during the session and/or information indicating the types of events the session creator has frequently streamed), can be applied to enhance the advertising campaign. Such information can be used, for example, to attract advertisers, and/or calculate compensation for impressions and/or conversions.

In one example, monetized videos sessions that are recorded are optionally exportable to digital files that can be stored locally and/or remotely and are accessible for replay on different applications, platforms, and devices. A recorded monetized video session can be, for example, exported and attached to a social media communication.

FIG. 1 is a schematic diagram of an information marketplace system 100 configured to support a monetized video session service 101 executing on a server computer 160 and an information marketplace platform application 132 configured to communicate with the monetized video session service 101 over a network 150 according to an example. The system 100 may include one or more computing device (s) 102, 104 connected to one or more server computers 160, 161 through one or more networks 150.

The network 150 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. Furthermore, remote computers and other related electronic devices could be remotely connected to either LANs or WANs via a modem and temporary telephone link. The network 150 includes any communication method by which information may travel between computing devices.

Generally, the computing devices 102, 104 may be any type of network-enabled device having a camera or video capturing capabilities. In some examples, the computing devices 102, 104 may be consumer computing devices and can be a mobile computing device (e.g., a smart phone, a PDA, a tablet, an augmented reality device, a wearable device, such as a wrist or head mounted device, a virtual reality device, or a laptop computer), a robotic computing device (e.g., a drone), and/or a non-mobile personal computing device (e.g., a desktop computing device, internet-enabled television or entertainment system). The computing devices 102, 104 may include virtually any computing device that typically connects using a wired communications medium such as telephones, televisions, video recorders, cable boxes, gaming consoles, personal computers, multi-processor systems, microprocessor-based or programmable consumer electronics, network PCs, or the like.

As shown in FIG. 1, the computing device 102 may include one or more processors 106 (e.g., a processor formed in a substrate, such as a central processing unit, a graphics processor, etc.), a volatile memory 108, and nonvolatile memory 110. The volatile memory 108 may store, for example, instructions that are executed by the processor(s) 106, and the nonvolatile memory 110 may store, for example, various user data, instructions for executing an operating system, applications, etc. While FIG. 1 illustrates the computing device 102 in more detail than the computing device(s) 104, it is understood that the computing device(s) 104 may include similar components.

The computing device 102 may include a plurality of applications 114, which can be executed by the computing device 102 (e.g., by the processor 106 executing one or more instructions stored in memory 108 or 110 that correspond to the application) and which may communicate with the operating system 112 (e.g., through one or more application programming interfaces (APIs)). Execution of the applications 114 can provide various functionalities to a user of the computing device 102. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application.

A camera application can provide access to use of the camera 116 within the computing device 102 for capturing still pictures or video. In some examples, the camera 116 may be external to the computing device 102, such as a camera that communicates wirelessly, e.g., via BLU-ETOOTH or Wi-Fi, with the computing device 102. Applications that provide a rich variety of other functionalities and information to the user also can be provided. In some examples, the information marketplace platform application 132 may be considered one of the applications 114.

In some embodiments, the computing device 102 includes a display 118 (e.g., a touchscreen display, an LED display, etc.) that can display a user interface for an application 114 that is being executed by the device. More than one application can be executed at a time. However, in some examples (e.g., in the case of a smart phone), the size of the display is better suited for a single executing application to be displayed at a time. The executing application that is displayed on the display 118 can be referred to as a "front-facing" application. In some examples, the display 118 may be housed in a structure separate from a structure housing one or more of the other components of the computing device 102 (e.g., the display 118 is a stand-alone display).

The computing device 102 may include internal speakers 117 that can provide an audio output from the device. The computing device 102 may also include a port or interface (e.g., USB, micro-USB, cable interfaces, HDMI, wireless interface, etc.) that can be used to connect the computing device 102 to external devices, e.g., speakers that may provide an audio output when connected to the device 102 or other types of sensors, cameras, or computing devices. The computing device 102 may also include a microphone 123 that detects sound in the environment of the computing device 102. In some examples, the microphone 123 may be external to the computing device 102. The microphone 123, whether internal or external, may provide audio for a monetized video session video stream.

The computing device 102 may include a connection graph 142, which may be a subset of a connection graph 168 that resides on the server 160. A connection graph is a data structure representing relationships (i.e., connections) between one or more entities. For example, the connection graph 168 may be a data set that stores relationships between social media accounts. Relationships may include friending, following, linking, or some other relationship. An entity is directly connected to another entity in the connection graph when the two entities are connected by a path length of one, i.e., there are no intervening nodes.

The computing device 102 may also include a clock 120 that determines a time and date and may include a GPS transceiver 124 that communicates with a global positioning system to determine a location of the computing device 102. The location may be provided as part of the metadata associated with a monetized video session video stream. The computing device 102 also includes various network interface circuitry, such as for example, a mobile network interface 126 through which the computing device 102 can communicate with a cellular network, a Wi-Fi network interface 128 with which the computing device 102 can communicate with a Wi-Fi base station 182, a BLU-ETOOTH network interface 130 with which the computing device 102 can communicate with other BLUETOOTH devices (e.g., an external camera, microphone, or speakers), and/or an Ethernet connection or other wired connection that enables the computing device 102 to access network 150. The computing device 102 may include other sensors (not shown), such as, for example, an ambient light sensor, a temperature sensor, an accelerometer, etc.

The information marketplace platform application 132 may be configured to enable the computing device 102 to communicate with the monetized video session service 101 over the network 150. The information marketplace platform application 132 may be configured to enable the computing device 102 to configure a paywall for the monetized video session, configure the admission protocols to the monetized video session, start a monetized video session video stream and share the real-time video stream via a social media platform. This is discussed in more detail with respect to FIGS. 2, 3A, 3B, 3C, and 4.

The information marketplace platform application 132 may be a mobile application or may be a web-based application. The monetized video session service 101 may also include a moderator engine 122. The moderator engine 122 may offer additional mechanisms to configure the monetized video session, and simultaneously collate data for the paywall for the monetized video session. For example, a session creator may upload content to be previewed at the paywall of the monetized video session. The moderator engine 212 can control what participants see and interact with, and which participants are able to have access to video streaming and/or audio streaming. The moderator engine 212 includes a schedule engine 120A configured to enable a session creator to establish a date and time of a monetized video session. The moderator engine 212 also includes a paywall engine 120B configured to enables a session creator to select a monetization model for the monetized video session. For example, the paywall engine 120B may provide a "subscription video on demand" (SVOD) service configured to charge participants a subscription fee for access to a library of on-demand digital content or a series of real time monetized video sessions of the session creator. In some examples, the on-demand digital content can include NFT tagged digital content. Subscriptions can be monthly, annually, or even quarterly.

The paywall engine 120B may provide a "transactional video on demand" (TVOD) service configured to charge participants on a pay-per-view of on-demand digital content or a real-time monetized video session of the session creator. Participants pay for each piece of content they want to watch. The paywall engine 120B restricts free access to digital content by requiring a viewer to purchase the video or pay for a subscription to gain access to the content.

In some examples, the paywall engine 120B may provide a white-label paywall and white-labeling invoicing to the session creator. In this way, the session creator may include branding on the paywall and/or customer receipts. In some examples, the session creator may configure the streaming service with branding, via a white-label streaming service. The paywall engine 120B may provide multiple currency support, enabling a global information marketplace. The paywall engine 120B may enable the session creator to configure promo codes, offer sales and other discounts. Furthermore, the paywall engine 120B may offer schedule pricing. For example, the paywall engine 120B may enable the session creator to offer a discount for early purchases, start charging more after a certain date or schedule a time when sales begin. The paywall engine 120B may enable the session creator to configure the terms of service. In this way, monetized video session creators can monetize on their own terms, by including custom terms of service agreement for purchasers.

Figure 2:
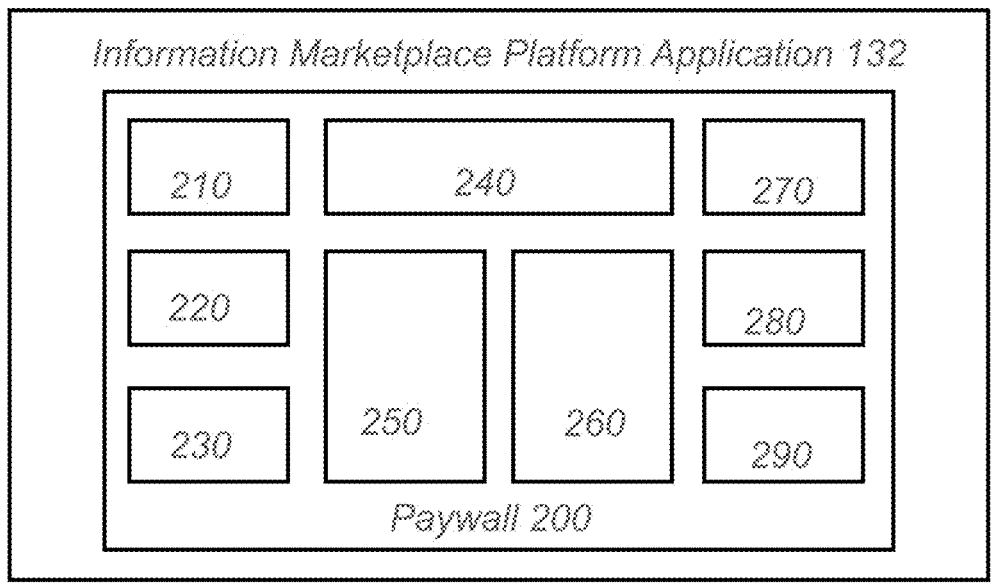
FIG. 2 is a schematic diagram of a paywall for the monetized video session of the information marketplace platform according to an example.

FIG. 2 is a schematic diagram of a paywall 200 for the monetized video session of the information marketplace platform application 132. For example, the paywall 200 for the monetized video session is a user interface enabling a participant to view content associated with the monetized video session, including, a profile icon 210 of the monetized video session creator, a number of participants 227 who may join the session and a number of participants 240 who may join the session without having to satisfy the threshold value (e.g., free seat). The paywall 200 for the monetized video session also displays at least one hashtag 270 associated with the monetized video session and profile icons 280 of users who are attending the monetized video session. In some examples, the free seats may be offered to anyone using the social media platform of the information marketplace platform application 132.

The information marketplace platform application 132 may provide a message (e.g., push notification) to those directly connected to the monetized video session creator (e.g. following the monetized video session creator) in a connection graph, but anyone may join the monetized video session after qualifying as a participant who does not have to satisfy the threshold value. In other examples, the free seat may be offered only by to those selected by the monetized video session creator. For example, the monetized video session creator may select some or all of those directly connected to the monetized video session creator in a connection graph (e.g., connection graph 142 or 168). As another example, the monetized video session creator may select those who the monetized video session creator is following who also follow the monetized video session creator in the connection graph. As another example, the information marketplace platform application 132 may enable the monetized video session creator to select specific individuals (e.g., via a username, phone number, or other identifier) as target participants for the free seats. The participants selected by the monetized video session creator may receive a message (e.g., push notification), which includes a link to the user interface of the monetized video session to request admission to the section without satisfying a threshold value for admission.

The paywall 200 may also allow a participant to join the session by actuating a payment transaction engine 220. The paywall 200 may also allow a participant to share the session by actuating a share engine 290. In some examples, the paywall 200 for the monetized video session may include a video stream display 250 that displays at least a portion of saved monetized video sessions or other media made available by the monetized video session creator via the moderator engine 122.

The information marketplace platform application 132 may also enable the monetized video session creator to configure the whether the monetized video session is public or private. A public monetized video session may be accessible by any participant using the social media platform upon bypassing the paywall at the paywall 200 of the monetized video session. The social media platform may provide a message (e.g., push notification) to those directly connected to the monetized video session creator (e.g. following the monetized video session creator) in a connection graph, but anyone may join the monetized video session. The paywall 200 of the monetized video session may be accessible only by those selected by the monetized video session creator when the monetized video session is private.

Alternatively, the paywall 200 of the private monetized video session may be accessible; however, the private monetized video session may only be accessible only by those selected by the monetized video session creator. For example, the monetized video session creator may select some or all of those directly connected to the monetized video session creator in a connection graph (e.g., connection graph 142 or 168 of FIG. 1). As another example, the monetized video session creator may select those who the monetized video session creator is following who also follow the monetized video session creator in the connection graph. As another example, the information marketplace platform application 132 may enable the monetized video session creator to select specific individuals (e.g., via a username, phone number, or other identifier) who are target participants for a private monetized video session. The participants selected by the monetized video session creator may receive a message (e.g., push notification), which includes a link to the user interface of the monetized video session. In some examples, for a private monetized video session only those who receive the push message may review the monetized video session. In other words, the target participants cannot share the link to the user interface of the monetized video session. In some examples, social media users who are not invited to the monetized video session may not be able to view the monetized video session unless one of the target participants sent an invitation to the monetized video session, but the monetized video session creator may disable such sharing by target participants.

Figure 3A:
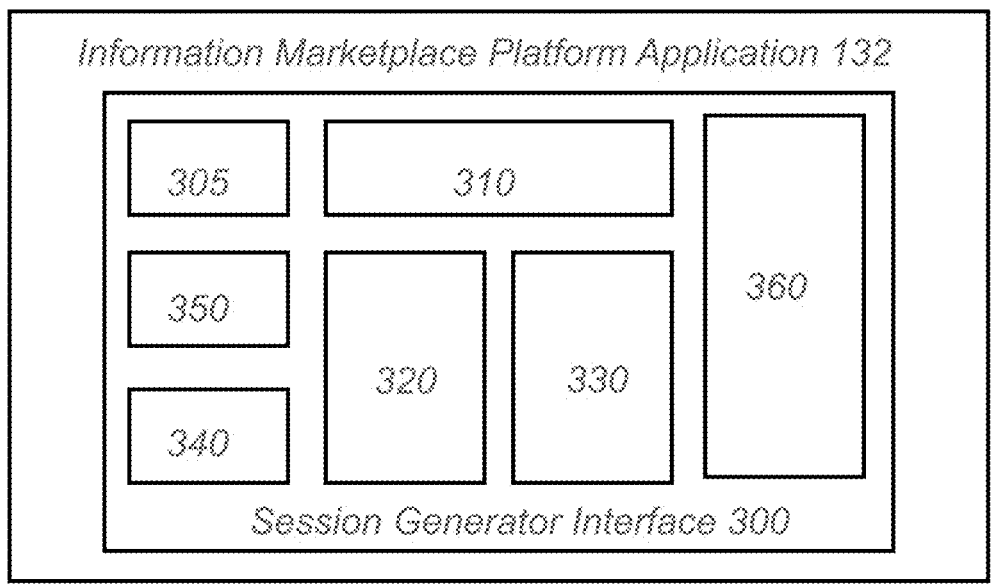
FIG. 3A is a schematic diagram of a session generator interface of the information marketplace platform according to an example.

FIG. 3A is a schematic diagram of a session generator interface 300 of the information marketplace platform application 132. For example, the session generator interface 300 allows a user to interact with the moderator engine 122 of monetized video session service 101 to configure the monetized video session. In some examples, the session generator interface 300 may include a data inserter to designate whether the monetized video session is public or private (e.g., 310 and 320, respectively). In some examples, the session generator interface 300 may include an icon data selector to designate whether the monetized video session is public or private (e.g., 310 and 320, respectively). The session generator interface 300 may also include contextual data inserters 330 and 340, operating in conjunction with moderator engine 122 of monetized video session service 101 to provide contextual data to the paywall 200 of the monetized video session. This is discussed in greater detail with respect to FIG. 3B and FIG. 3C. The contextual data inserter 330 may receive contextual data with respect to the topic of the monetized video session. The contextual data inserter 340 receives contextual data with respect to the scheduling of the monetized video session.

Figure 3B:
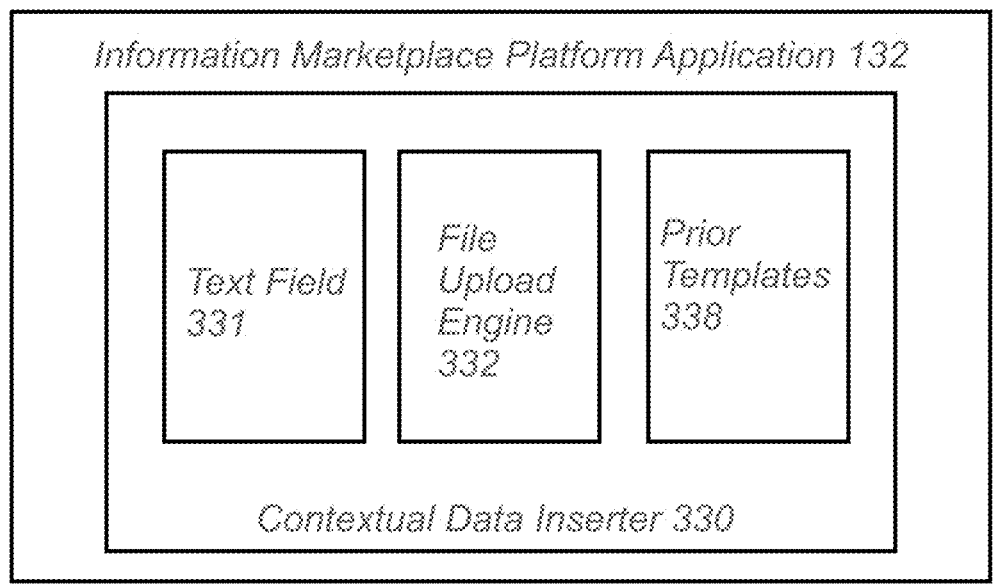
FIG. 3B is a schematic diagram of a first contextual data inserter of the information marketplace platform according to an example.

FIG. 3B is a schematic diagram of a contextual data inserter 330 of the information marketplace platform application 132. For example, the contextual data inserter 330 allows a user to interact with the moderator engine 122 of monetized video session service 101 to provide contextual data with respect to the topic of the monetized video session. In some examples, the contextual data inserter 330 may include a text field 331 for receiving descriptive data of the monetized video session. The descriptive data of the monetized video session may include information such as, for example, the tile of the session, a description of the session, and other information the monetized video session creator inputs. In addition, the contextual data inserter 330 may include a file upload engine 332 configured to receive an image file, video file or other media file to be presented on the paywall 200 of the monetized video session. Alternatively, or in addition, the file upload engine 332 may be configured to receive an image file, video file or other media file to be presented on during the monetized video session stream.

The contextual data inserter 330 may include at least one identifier 333A to associate with the monetized video session. The identifiers associated with the monetized video session may be used to find similar posts in a social media platform. In some examples, the identifiers may include hashtags. A hashtag may be used to identify sessions, messages, posts, and re-posts about a particular topic and can be used to identify trending topics. The contextual data inserter 330 may also include an identifier generator 333B to generate an identifier to associate with the monetized video session. The contextual data inserter 330 also includes at least one metric input. The metric inputs may include a threshold value for admission, a total number of users 336 that may participate in the session, and the total number of users 337 who are authorized to bypass a paywall and stream the monetized video session. The contextual data inserter 330 may also enable the monetized video session creator to be able to retrieve previous data input as prior templates 338.

Figure 3C:
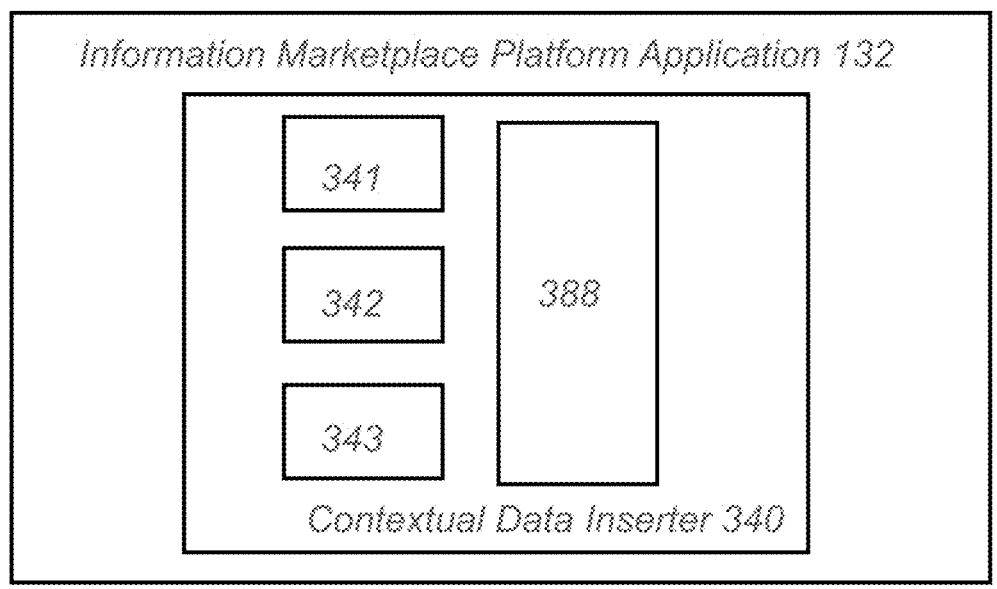
FIG. 3C is a schematic diagram of a second contextual data inserter of the information marketplace platform according to an example.

FIG. 3C is a schematic diagram of a contextual data inserter 340 of the information marketplace platform application 132. For example, the contextual data inserter 340 allows a user to interact with the moderator engine 122 of monetized video session service 101 to provide contextual data with respect to scheduling the monetized video session. The contextual data may include, for example, a start time of the session 341, an end time for the session 342, and the date of the session 343. The contextual data inserter 340 may also enable the monetized video session creator to be able to retrieve previous data input as prior templates 338. The session creator 300 of 23A enables a session creator located at either computing device 102 or 104 to schedule a monetized video session and create a paywall 200 for the monetized video session.

Figure 4:
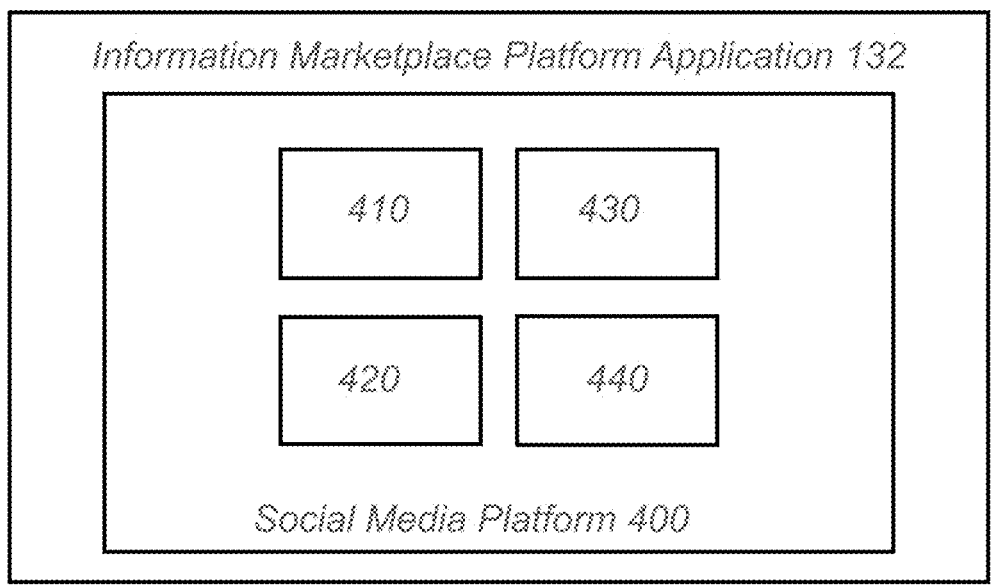
FIG. 4 is a schematic diagram of a social media platform of the information marketplace platform application.

FIG. 4 is a schematic diagram of a social media platform 400 of the information marketplace platform application 132. The social media platform 400 includes user submitted content 410, AI module 420, user profile settings 430, and user activity data 440. The user submitted content 410 may include digital images, digital videos, links to the paywall 200 of the monetized video session, and textual information. The user submitted content 410 may be displayed on a message board in various methods. For example, the user submitted content 410 may be displayed in a manner to encourage meaningful customer engagement. The AI module 420 may intensify the importance and viewership of local, familial and friendly posts, rather than business posts. In some examples, the monetized video session may be ranked separately but still revolves around engagement, customer response, and relevance to the subject matter. The AI module 420 may also engage in spam management, managing and removing false accounts.

The AI module 420 may provide a guided search method that uses data collected from past content interactions to encourage new links. In this way, the AI module 420 provides an algorithm that pushes familiar content to the user. This makes the content more likely to be consumed and enjoyed. In another example, the user submitted content 410 may be displayed in a manner to encourage networking. For example, the AI module 420 may display user submitted content 410 based on connection and engagement, so strong and relevant content is centered. In this way, in the event a user does not have a large digital association, one may be established if you have monetized-worthy content.

In another example, the user submitted content 410 may be displayed not only by relation to the user but to time and date posted. Fresh and updated material ranks higher than day-old user submitted content 410. The number of engagements to a user submitted content 410 will also influence its rank. In some other examples, the AI module 420 focuses on every aspect of social media, from relevancy and connection to engagement and content popularity.

Referring back to FIG. 1, the information marketplace platform application 132 may be configured to use various components of the computing device 102 or components in communication with computing device 102 to capture and send a real-time video stream and to display interactions (e.g., engagement representations) from participants of the real-time video stream. For example, the information marketplace platform application 132 may use the camera 116, the GPS 124 (or other location-obtaining sensors), and the microphone 123 of the computing device 102 to capture a real-time video stream with audio. In some examples, the GPS 124 may associate a location with the real-time video stream.

The information marketplace platform application 132 may include a transcoding engine 134, which may be configured to determine the throughput between the device 102 and the server 160 via networks 150. The throughput represents the bandwidth available to transmit the real-time video stream from computing device 102 to the server 160. When bandwidth is low the transcoding engine 134 is configured to reduce the video quality sent to the server 160. This differs from conventional streaming systems where the server 160 determines the video quality sent to each viewer based on the viewer's connection. In contrast, the information marketplace platform application 132 decides the video quality for all participants based on the bandwidth available to the computing device 102. This ensures that latency is kept low, e.g., a few seconds or less. The low latency ensures that engagements are relevant to the monetized video session creator—in other words, the monetized video session creator receives almost real-time engagements. A latency more than a few seconds, and certainly a latency of 30 seconds or more would make engagements too old to provide effective communication between the monetized video session creator and the participants.

The information marketplace platform application 132 may also be configured to attach a timestamp packet to the frames of the real-time video stream provided from computing device 102 to the server 160. This special packet enables the server 160 to associate an engagement with a particular time in the live feed monetized video session. The information marketplace platform application 132 may also be configured to use one of the computing components (e.g., Wi-Fi network interface 128, mobile network interface 126, etc.) to provide the real-time video stream, over the network 150, to a server, such as servers 160, 161. The information marketplace platform application 132 may also be configured to receive engagement indications as well as metadata about the real-time video stream from the servers 160, 161. The engagement indications may be in a data stream that is associated with the video stream. The metadata may include information such as how many participants have joined the real-time video stream and are currently viewing the video stream. The engagement indications may represent feedback and information from the participants of the video stream. For example, the engagements may include comments, signals of appreciation, share notifications, viewer join notifications, etc. The information marketplace platform application 132 may be configured to receive the data stream and to generate representations of the engagement indications in the data stream and provide the representations to the display 118.

The information marketplace platform application 132 may be configured to trigger the display of engagement notifications, such as comments from participants, viewer join notices, and viewer share notifications. The engagement notifications may be displayed with the real-time video stream (and the icons representing signals of appreciation). Like the icons, the engagement notifications may be associated with a moment in time (i.e., a timestamp) and displayed for a predetermined period of time after the moment in time, so that after the predetermined time the notification fades out, for example. The information marketplace platform application 132 may scroll comments, so that older comments are moved up (or down or sideways) to make room for new engagement notifications. Thus, while a user of the computing device 102 is providing a real-time video stream, the user of the computing device 102 may also receive real-time feedback from the participants of the real-time video stream. In some examples, the information marketplace platform application 132 may also be configured to allow the user to share the real-time video stream via the social media platform. When the user shares the video stream, the interactive video sharing engine 170 may be configured to send a message to user accounts directly connected to the session in a connection graph for the social media platform. In some examples, the message may be a push notification or an email with a control (e.g., link) that allows the invited user to join the video stream. In some examples, the targeted viewer (e.g., the viewer receiving the notification) may join via a computing device with the information marketplace platform application 132 installed. In some examples, the targeted viewer may join via a browser application or another mobile application without using the information marketplace platform application 132, which may include viewing the real-time video without engagements.

In some examples, when there are more than a threshold number of participants on a particular monetized video session video stream, the monetized video session service 101 may limit the chat functionality to a predefined number such as the first N participants of the monetized video session. The other participants may be placed on a waiting list. When an early viewer leaves the monetized video session, the next-in-line viewer may participate in chat. In other words, the monetized video session service 101 may queue the participants of a particular monetized video session video stream in the order of arrival time and permit the first N participants from the top of the queue participate in chat. The participants allowed to participate in chat may be able to provide the full range of engagements such as comments, messages, and indications of approval. However, the other participants may not be able to provide messages or comments back to the monetized video session creator. In other examples, the monetized video session service 101 may arrange the participants in the queue according to a ranking scheme. For example, high credibility users and/or associations (e.g., friends, followers, etc.) of the monetized video session creator may have a priority in the queue. For instance, the monetized video session service 101 may bump these types of participants to locations that are higher in the queue. Also, the monetized video session service 101 may remove certain messages that have a relatively low engagement level (e.g., not many indications of approvals or likes) or messages that have been flagged for various reasons. Also, the monetized video session service 101 may use a queue that is more user or context specific. In other words, the queue (or the chat-enabled list) can be user-specific (context specific). For example, all users can be enabled (to enter the queue) but only certain chats may be surfaced to each viewing user. Comments from associations of the viewing user (context user) can be surface from that user, comments from participants having relevance or interest to the viewing user can be surfaced to that user, blocked users can be ignored that user, etc.

In some examples, the monetized video session service 101 may enable the live monetized video session to be posted via other social media platform messages. Such posts may include the video stream but may lack the interactive capabilities. Thus, for example, a social media user in a different platform can receive a message formatted for the different platform that includes the video stream that the social media user can watch. Such a message can include a suggestion that the social media user download and install a version of the information marketplace platform application 132 or include a link or other control that opens the information marketplace platform application 132 or initiates the install. In some examples, the server 160may associate comments about the message from the other social media platform with a stored version of the monetized video session, e.g. as post-monetized video session chat engagements.

The information marketplace platform application 132 may be configured to provide the real-time video stream from a computing device 102 of the monetized video session creator to a server, such as the servers 160, 161. The server 160 may be a single computing device or may be a representation of two or more distributed computing communicatively connected to share workload and resources. In some examples, the server 160 is a social media platform server. The server 160 may also include one or more processors 176 formed in a substrate configured to execute instructions. The instructions may be stored in memory, such as RAM, flash, cache, disk, tape, etc. In addition, the server 160 may include one or more data stores configured to store data in a persisting manner. For example, the server 160 may store the connection graph 168. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some examples the connection graph 168 may represent entities that have installed an information marketplace platform application 132 and set up a user account through the information marketplace platform application 132.

In some examples, the connection graph 168may represent entities from more than one social media platform or entities that have installed various social media applications. Thus, the connection graph 168 may be understood to represent multiple distinct data sources, each representing a separate set of entities and relationships for separate social media platforms. In some examples, a first user account in one data store may include an identifier for a second user account in a second data store, where the first user account and the second user account correspond to a single human user. Thus, the interactive video sharing engine 170 may be able to access the second data store via the link between the first user account and the second user account. The system may thus access a second social media platform via such connected accounts. The human user may have control over such connections.

The server 160 may also store monetized video session metadata 166. Monetized video session metadata 166 may store data, e.g., information and statistics, for real-time monetized video session s and/or monetized video session creators. The data may include the engagements received during the live monetized video session (and in some examples, from replays (e.g., replays 220 of FIG. 2) of the stored monetized video session), time stamps, duration, the total quantity of participants, how long each viewer watched the real-time monetized video session , etc. The server 160 may also store stored video streams 164 for a limited time. For example, when a monetized video session creator completes a real-time monetized video session, the monetized video session creator may choose to make the video stream available for replay. Accordingly, the server 160 may store the video stream in stored video streams 164. The stored video stream may include the engagement indications associated with the video stream. In other words, when the stored video stream is replayed, the viewer watching the replay may also see any engagements received during the real-time video stream.

The server 160 may also include an interactive video sharing engine 170. The interactive video sharing engine 170 may service a social media platform, and thus, have access to the connection graph 168 for the social media platform. A video stream is live or real-time when the source of the video stream is a video capture device rather than storage media. The interactive video sharing engine 170 may include a video streaming engine 172 and a video discovery engine 174. The video streaming engine 172 may be configured to provide the transcoded video stream, including any added engagement indications, to client viewing devices (i.e., other instances of device 102) in a format appropriate for a particular client viewing device. The interactive video sharing engine 170 may be configured to receive the video stream from a computing device 102 (e.g., smartphone or wearable computing device) of the monetized video session creator and to provide it in a variety of different formats or playback on viewing computing devices 102. Thus, the interactive video sharing engine 170 may convert the live video stream from the monetized video session creator into a plurality of formats and, when a viewing computing device 102 joins the real-time video stream, the video streaming engine 172 may select, based on information about the viewing computing device 102, an appropriate format for the viewing computing device 102. The interactive video sharing engine 170 may be configured to receive engagements from the viewing computing devices 102 and provide engagement indications with the video stream provided to the various computing devices 102. The interactive video sharing engine 170 may also provide the engagement indications to the computing device 102 of the monetized video session creator. The engagement indicators may be associated with a particular time in the real-time video stream. For example, an engagement may be associated with the time represented by a timestamp packet associated with the video frame displayed when the engagement was received.

The interactive video sharing engine 170 may be configured to receive a request to start a real-time video stream from a computing device 102 of the monetized video session creator. The request may include information from which the interactive video sharing engine 170can determine target participants. For example, the interactive video sharing engine 170 may use the connection graph 168 to determine user accounts directly related to the account for the monetized video session creator. These directly related user accounts may receive a message, for example a push notification, regarding the monetized video session. In some examples, only user accounts that have a "following" relationship with the account corresponding to the monetized video session creator may receive the message. When the monetized video session information indicates the monetized video session is private, the information may include identifiers (e.g. user account identifiers) for user accounts that can receive the message (e.g., push notification) about the live video stream. Thus, in some examples, a private monetized video session may be for a subset of the user accounts directly related to the monetized video session creator account in the connection graph 168(e.g., followers, friends, circles, or other forms of associations), whereas a public monetized video session can be joined by anyone, but only accounts directly related to the monetized video session creator are notified of the live video stream.

Based on the information received with the real-time video stream and the connection graph 168, the interactive video sharing engine 170 may send messages to the targeted participants. The message may be in the form of a push notification, but can be an email, or a text that includes a link or activation that connects the target viewer to the real-time video stream. In some examples, the targeted viewer may only view the real-time video stream if the computing device 102 used by the targeted viewer has an information marketplace platform application 132 installed. The information marketplace platform application 132 may be a mobile application or a browser-based application. Once a targeted viewer chooses to join the real-time video stream, the video streaming engine 172 may provide the encoded real-time video stream to the viewer, e.g., via computing device 102 or 104.

The interactive video sharing engine 170 may be configured to receive engagements from participants, associate an engagement with a moment of time, and provide engagement indications with the video-stream to viewing computing devices and the monetized video session ing device. An engagement is some type of interaction from one of the participants. For example, a signal of appreciation is a type of engagement where a viewer expresses approval at a particular moment during the real-time video stream. Another example of an engagement is a comment provided by a viewer. The moment in time may be represented by the time in a timestamp packet associated with the frame that was being displayed when the engagement was received by the client device. Another example is a share, which may have a corresponding share notification telling other participants and the monetized video session creator that a viewer has invited other participants. In some examples, only a public monetized video session may allow sharing. In some examples, the monetized video session creator can control whether participants can invite other participants to a private monetized video session. Another example of an engagement is a new viewer joining the monetized video session, which may be associated with a new viewer notification alerting the monetized video session creator and other participants of the new viewer.

The video streaming engine 172 may provide indications of the engagements with the video stream to encourage interaction among the participants and monetized video session creator. In some examples, the interactive video sharing engine 170 may aggregate the different types of engagements, generating statistics for the monetized video session. For example, the interactive video sharing engine 170 may track the number of signals of appreciation received from all participants per minute, track the total number of signals of appreciation, track the comments per minute, track the total number of comments, track the total number of participants, track the average viewing time of the participants, track the number of shares, etc. The statistics may be stored in the monetized video session metadata 166. The monetized video session metadata 166 may be used to feature popular monetized video session s (e.g., measured by number of participants, average of signals of appreciation per second correspondence with social media messages or other monetized video session s, etc.) for replay, to suggest popular monetized video session creators (e.g., based on total number of signals of appreciation received over all monetized video session s or based on a high average number of signals of appreciation per second across all the monetized video session s for the monetized video session creator, etc.), to notify potential audience members about a popular live monetized video session.

The video discovery engine 174 may enable the interactive video sharing engine 170 to suggest real-time video streams and/or stored video streams, e.g., in stored video streams 164, to a viewer. In some examples, the video discovery engine 174 may use the monetized video session metadata 166 to provide or suggest real-time video streams to a user. For example, the video discovery engine 174 may suggest a real-time video stream that has received many signals of appreciation in a short duration, a real-time video stream that has a quantity of participants that exceeds a threshold, a real-time video stream that has an average number of engagements per second that exceeds a threshold, etc. The video discovery engine 174 may boost the position of a real-time video stream in the search result based on attributes of the user. For example, the video discovery engine 174 may boost a real-time video stream associated with a known interest of the user in the search result. The video discovery engine 174 may determine an interest for the real-time video stream based on words in the title or comments, or landmarks identified in the video stream. For example, the video discovery engine 174 may determine that a real-time video stream titled "Vail black diamond" is associated with skiing, which maybe a known interest of a particular user and the video discovery engine 174 may boost the ranking of this video stream for that user in a list of suggested video streams. Similarly, the video discovery engine 174 may associate the video stream with skiing based on the content of the comments.

In some examples, the video discovery engine 174 may use other social media messages to determine an interest for the user. For example, a user may post or re-post messages in a first social media platform that include hashtags. A hashtag may be used to identify messages about a particular topic and can be used to identify trending topics. The video discovery engine 174 may be in communication with the first social media platform and may identify topics the user has recently posted and may give any real-time video streams that include the topic in the comments (e.g., use the same or similar hashtag) a position of prominence in a list of suggested real-time video streams for that user. As another example, the video discovery engine 174 may determine a topic, e.g., related to one or more hashtags, that is trending, or in other words being used by many different users of the first social media platform. Any real-time video streams that also include comments with that topic may be listed in a position of prominence in a list of suggested real-time video streams for users of the information marketplace platform application 132.

The video discovery engine 174 may also use location data to suggest real-time video streams for viewing. For example, the video discovery engine 174 may identify several real-time video streams that are in close proximity to each other. Such real-time video streams may be an indication of an important event occurring at the location. The video discovery engine 174 may suggest one or more of these real-time video streams (e.g., selected at random, based on past popularity of the monetized video session creator, based on number of participants of the stream, etc.) as a suggested real-time video stream. In some examples, the video discovery engine 174 may initiate a user interface that shows the location of the real-time video streams and enables a user to select one of the real-time video streams for preview of viewing. For example, the user may navigate in a map that includes an icon representing the location of live video streams and the user may select an icon to join or preview the live video stream associated with the location.

In some examples, the video discovery engine 174 may receive a query from a user and search titles of live video streams and/or comments provided in live video streams and provide video streams with responsive titles or comments in a search result to the viewer. The video discovery engine 174 may also search titles and comments for stored video streams and provide one or more stored video streams in the search result. Although described above as a live video stream search tool, the video discovery engine 174 may use similar techniques to search and surface recorded video streams, e.g., those stored in stored video streams 164. The video discovery engine 174 may interact with a user in the information marketplace platform application 132 to receive input from the user and display results, e.g., a list of live or stored video streams, to the user.

The information marketplace platform application 132 executing on the computing device 102 may also be configured with a viewing user interface that enables a potential viewer to receive a notification about a live video stream, join the stream, and provide feedback in the form of comments or signals of appreciation, to invite others (when approved by the monetized video session creator), and to share via a social media platform. The information marketplace platform application 132 may also be configured to enable a user of the computing device 102 to update the connection graph (e.g., connection graph 168 and/or 142) to enable the user to receive notifications to join real-time monetized video session s from a particular account (e.g., an account of the social media platform). For example, the information marketplace platform application 132 may help a first user account follow or like a second user account, so that monetized video session notifications from the second user account are presented to the first user.

The information marketplace platform application 132 may be configured to display messages regarding live video streams. A live video stream is one that occurs in real-time, as the monetized video session creator captures the image. In other words, in a live or real-time video stream the source of the video stream is a video capture device (e.g., camera 116). In contrast, the source of a replay of a video stream is storage media. If a user chooses to view the live video stream, the information marketplace platform application 132 may display the real-time video stream on the display 118 of the viewer's computing device 102. The information marketplace platform application 132 may also be configured to enable the user to provide engagements during the live video stream. For example, when a user provides an appreciation gesture, such as a tap on a touch screen display 118 or use of an input device, such as a mouse, to click in the display 118, while watching the live video stream, the information marketplace platform application 132 may interpret the tap or click as a signal of appreciation. The information marketplace platform application 132 may provide information about the signal of appreciation to the server 160. The information about the engagement may include an identifier for who provided the signal and when it was provided, for example by identifying the time in the timestamp packet associated with the frame being displayed when the engagement was received. At the server 160, the video streaming engine 172 may receive the engagements and may provide information about the engagements to the participants and the monetized video session creator. This information may be used, at each computing device 102, 104, to generate representations of the engagement, as described above. Thus, the video streaming engine 172 provides information to all participants participating in the real-time video stream about engagements from any of the participants.

The information marketplace platform application 132 may also enable a viewer to enter comments, which are provided to the interactive video sharing engine 170at the server 160. The interactive video sharing engine 170 may provide information about this engagement, such as the initials or username of the viewer providing the comment, as well as the content of the comment and a timestamp for the comment, to viewing devices. In addition to comments, the information marketplace platform application 132 may enable a viewer to invite others to view the live video stream. For example, anyone connected to the viewer via the connection graph 168 or 142 may receive a message with an invitation to join the live video stream. The information marketplace platform application 132 may also enable a viewer to leave the monetized video session or rejoin the monetized video session at any time.

Once a monetized video session completes, the interactive video sharing engine 170 may store the video stream formats and the engagement indications that correspond to the video stream, for example storing them in the stored video streams 164. In some examples, the monetized video session creator can prevent the video stream from being stored at the server 160. The interactive video sharing engine 170 may store the engagement indications with the stored video stream, as well as the monetized video session metadata. The interactive video sharing engine 170 may delete the stored video stream after the limited time expires. For example, the interactive video sharing engine 170 may delete any saved video streams that are more than 12 or 24 hours old, depending on the length of the limited time. In some examples, the interactive video sharing engine 170 may enable participants to select a stored video stream for replay. In some examples, only those in the original audience (e.g., those indicated by the monetized video session creator in a private monetized video session, or only those following a monetized video session creator) may replay the video stream. In some examples any viewer may replay the stored video stream.

During replay of a stored video stream, the interactive video sharing engine 170 may receive additional engagements from the replay viewer. In some examples, the interactive video sharing engine 170 may aggregate the engagements with the monetized video session metadata 166 for the stored video stream. For example, if the replay viewer provides several signals of appreciation, the interactive video sharing engine 170 may add these to the statistics for the monetized video session. In some examples, the interactive video sharing engine 170 may optionally add the engagements to the stored video stream. For example, the signal of appreciation from the replay viewer may be assigned a time and engagement indicator in the stored video stream. In some examples, a replay engagement may include sharing the stored video stream. Sharing may include sending a message, e.g., via a social media platform, with a link or other element that enables others to find and replay the stored video stream.

In some examples, the information marketplace platform application 132 may provide a user interface that enables a user of the computing device 102 to select a stored video stream for replay. For example, the server 160 may store video streams for a limited time (for example 12 or 24 hours). This provides an opportunity for targeted participants (e.g., followers, friends, circles, or other associations receiving a push notification) who missed the live video stream to view a stored version of the video stream. The replayed version includes all engagement indications received during the live video stream. Thus, the replay viewer can experience the interactions that occurred during the live video stream. In some examples, the replay viewer may also be able to add engagements to the stored video stream. In other words, a replay viewer may add signals of appreciation and/or comments. In some examples, these engagements may be aggregated with metadata for the monetized video session, for example in monetized video session metadata 166. In some examples, the new engagement indications may be stored with the stored video stream, so that other replay participants watching the stored video stream at a subsequent time can see the new engagements added after the live video stream ended.

The information marketplace platform application 132 may include a video editing interface that allows a user to interact with a video editor 218 to annotate, edit, scrub, and augment the monetized video session stream, and automatically condense large monetized video session streams into summary snippets or include only the most interesting segment to create the replays 220. For example, as explained above, as the monetized video session stream is shown to participants, the participants may engage with the monetized video session stream in real-time by providing engagements which are then tied to the particular times the engagements were generated. The engagements may indicate a relevance/importance/likeness of certain segments of the monetized video session. Therefore, the video editor 218 may obtain a histogram of engagement with the monetized video session over time that depicts the various levels of engagement over the span of the monetized video session. Based on the histogram, the video editor 218 may identify the portions of the monetized video session that are associated with a higher amount of engagements, and then create one or more smaller clips that are more targeted to what people thought were relevant. As such, the video editor 218 can gather the segments of the monetized video session that have the highest engagement (e.g., an engagement above a certain threshold). Alternatively, the video editor 218 can crop out the segments of the video that were least interesting to the participants using the histogram. Alternatively, the summary snippets may be made available on a paywall 200 for a subsequent monetized video session. Furthermore, the summary snippets may be made available to users upon satisfaction of a reoccurring threshold value (e.g., monthly subscription). The monetized video session creator may establish a monthly subscription. Alternatively, or in addition, the information marketplace platform application 132 may establish a monthly subscription on behalf of the monetized video session creator for the monetized video session.

Therefore, the video editor 218 may function as a replay generator that can select shortened clips or video summaries (i.e., the replays 220) of the real time video session and provide these replays to participants at a later time. After the live stream of the event has stopped, these replays 220 (in addition to the full monetized video session) may be aggregated chronologically and stored as one or more networked accessible videos so that participants may opt to watch at their leisure. Optionally, the replays 220 are programmatically selected based on any type and any combination of available information suitable for detecting the occurrence of key activities, examples of which include indications of viewer interest, viewer engagement, and popularity with participants. An example measure of viewer interest is impression. Example measures of viewer engagement include a standardized ideogrammatic icon (e.g., a face or a heart), comments, and re-posts of another user's post. Example measures of popularity include monetized video session creator identity, viewer identity, impression, and re-Tweets. (The respective machine learning models for interest, engagement, and popularity may use common information.) The replays 220 may be programmatically selected when the measures of interest, engagement, and popularity reach a threshold level suggesting a reasonable likelihood of an occurrence of a key activity. Parameters of machine learning models and the threshold are adjusted to improve accuracy.

Optionally, frames of the live stream monetized video session are programmatically analyzed to detect key activities, either during the monetized video session or afterwards, and this information is used in conjunction with the information described above to programmatically select the replays 220 of the monetized video session. A change in the appearance of a scoreboard of a softball game is detected, for example, and in conjunction with comments suggesting a home run has been hit and identifying the hitter, and a spike in the number of standardized ideogrammatic icons from participants on a social graph, a segment of the monetized video session sufficient to capture the home run is selected and made into a replay 220.

Figure 5:
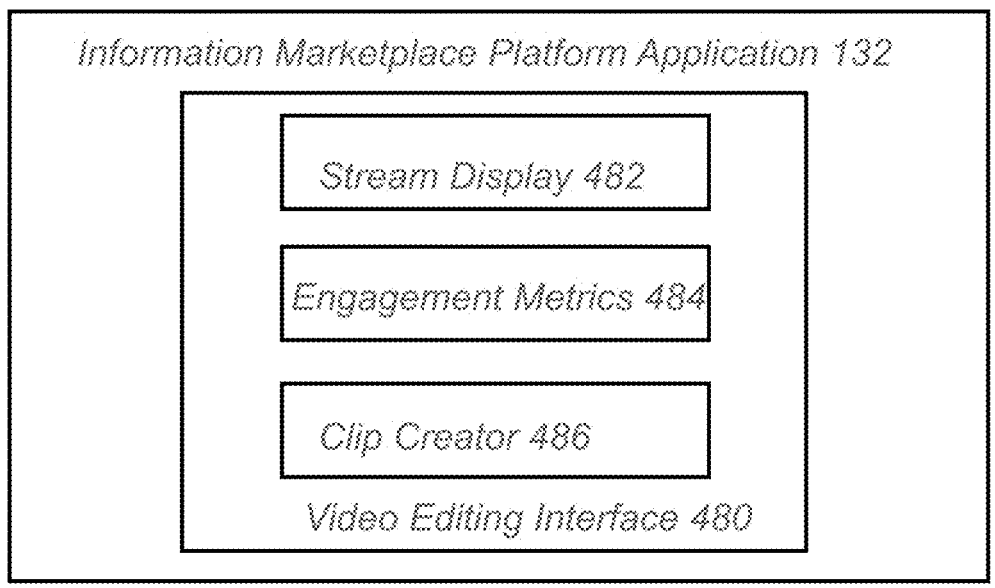
FIG. 5 is a schematic diagram of a video editing interface of the information marketplace platform according to an example.

FIG. 5 is a schematic diagram of a video editing interface 480 of the information marketplace platform application 132. For example, the video editing interface 480 allows a user to interact with the video editor 218 to annotate, edit, scrub, and augment the monetized video session streams, and automatically condense large monetized video session streams into summary snippets or include only the most interesting segment to create the replays 220. In some examples, the session generator interface 300 may include a monetized video session stream display 482 that displays the saved/lived monetized video session stream, and a portion that displays engagement metrics 484 that depicts a level of engagement (e.g., approvals, comments, etc.) over time as the monetized video session stream is displayed, and a clip creator 486 that automatically creates smaller clips corresponding to the portions of video having relatively higher levels of engagements.

As shown in FIG. 1, the video monetized video session service 101 may include a contextual data inserter 217 operating in conjunction with one or more third party services to insert contextual data into the monetized video session stream. The third-party services may be any type of outside service that obtains contextual data that is relevant to the monetized video session streamed by the computing device 102. In a few examples, the third-party services may include a translation service that provides translations in the form of captions. The contextual data may include any type of data relevant to the real time video session such as translations, captions, or generally any type of information that conveys information about the event that may not be readily apparent from the monetized video session stream itself. In a specific example, a runner in a marathon could be wearing a camera device, and this monetized video session stream is shared by the video monetized video session service 101 to one or more participants. The contextual data inserter 217 may insert the speed of the runner, his/her location relative to the length of the race, and the position with respect to other runners over the live monetized video session stream as an overlay onto the images of the monetized video session video stream. In another example, the contextual data inserter 217 may insert a density metric into the monetized video session stream to inform the participants how many people are located around the monetized video session creator in order to give the participants a more rich experience on what the actual event is like. In another example, the contextual data inserter 217 may insert metrics about the weather into the monetized video session stream in order to give the participants a sense of the weather in case it was not apparent from the video itself (e.g., conveying the temperature at Lambeau field during a Packer game in December).

More generally, during the course of the live monetized video session, the contextual data inserter 217 may insert the contextual data into the live video stream such that the context information is displayed proximate to the monetized video session stream on the participants' devices and/or the monetized video session creator's device. The contextual data inserter 217 may provide an overlay object on top of the images of the monetized video session stream. In some examples, the contextual data inserter 217 may create the overlay object to have a certain transparency so that the underlying video display is at least partially visible through the overlay object.

Figure 6:
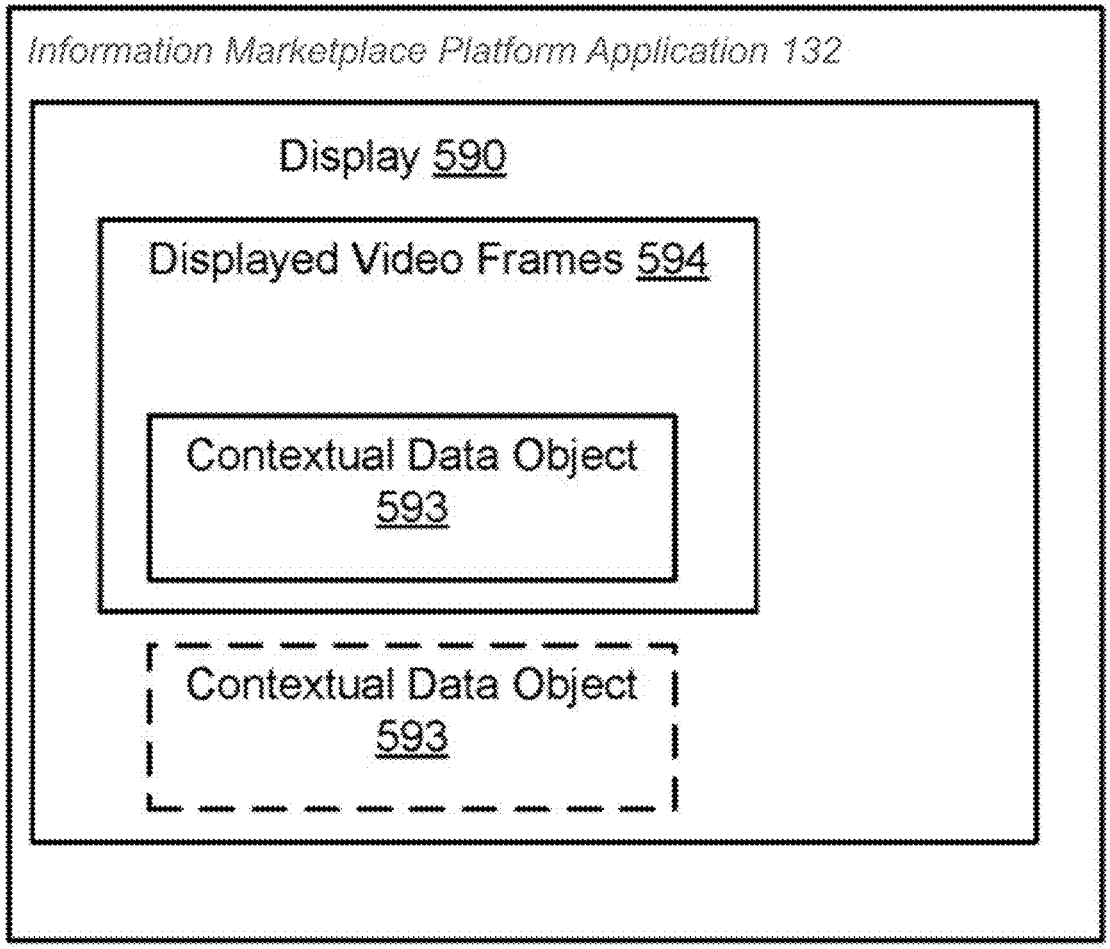
FIG. 6 is a schematic diagram of a video monetized video session stream that is enhanced with a contextual data object according to an example.

FIG. 6 is a schematic diagram of a video monetized video session stream that is enhanced with a contextual data object 593 according to an example. For example, the information marketplace platform application 132 may define a display 590 that depicts the video monetized video session stream. The contextual data inserter 217 may insert the contextual data object 593 carrying the contextual data into the video monetized video session stream such that the contextual data object 593 is overlaid on top of a portion of the display video frames 594 of the display 590 or displayed in a position apart from the displayed video frames 594.

As shown in FIG. 1, in other examples, the video monetized video session service 101 may include an augmented and virtual reality (AR/VR) unit 226 configured to augment the monetized video session stream itself. This may be done, for example, to incorporate contextual data into the monetized video session stream. For example, instead of placing an overlay on top of the monetized video session stream, the video AR/VR unit 226 may manipulate the video stream to insert the contextual data, such as product placement. Moreover, the augmented and virtual reality (AR/VR) unit 226 may be configured to communicate with an augmented reality device (e.g., 102) to augment a user's environment to incorporate objects (e.g., participants) of the monetized video session stream.

As explained above, when there are more than a threshold number of participants on a particular monetized video session video stream, the video monetized video session service 101 may limit the chat functionality to a predefined number such as the first N participants of the monetized video session. For example, the video monetized video session service 101 may queue the participants of a particular monetized video session video stream in the order of arrival time and permit the first N participants from the top of the queue participate in chat. In other examples, the video monetized video session service 101 may allow everyone to chat but, in some cases, only certain message are seen by the monetized video session creator (e.g., either the first 100 people or friends/followers of the monetized video session and then random people or the most "upvoted" or "liked" comments to the monetized video session creators).

In some examples, the video monetized video session service 101 may include multi-media feedback unit 227 configured to permit the viewer to respond to the monetized video session stream with audio or a separate video stream to be provided back to the monetized video session creator. For example, instead of just responding with text or other indications, the information marketplace platform's user interface may allow the viewer to respond with audio and/or video monetized video session streams, which the multi-media feedback unit 227 receives from the viewer's computing device 102 over the network 150, and then determines whether the monetized video session creator allows multi-media feedback from that viewer. For example, the monetized video session creator may permit certain associations or groups of associations to respond with audio and/or permit certain associations or groups of associations to respond with video streams. Therefore, if the monetized video session creator accepts multi-media feedback from that viewer, the multi-media feedback unit 227 may provide the audio and/or video, over the network 150, to the monetized video session creator for display. In some examples, the multi-media feedback may be overlaid on a portion of the video display. For example, a multi-media feedback object (e.g., square, rectangle) may be positioned over a portion of the video display in a semi-transparent manner. In other examples, the multi-media feedback object may be positioned in other parts of the user interface apart from the video display of the monetized video session ed stream. In some examples, the monetized video session creator may allow multiple monetized video session feedback streams from a number of different users at the same time, where the monetized video session streams are concurrently arranged on the user interface. In some examples, the monetized video session creator and the multiple participants may communicate with each other like in a video teleconference situation, where all participants can hear and speak to each other.

In some examples, the video monetized video session service 101 may include a software development kit (SDK) provider 232 configured to provide a software development kit for the information marketplace platform application 132 to third party applications. For example, a third-party application may communicate with the video monetized video session service 101 by integrating the software development kit into the third-party application. Instead of implementing the information marketplace platform application 132 as a stand-alone application on the computing device 102, third party applications may incorporate live stream content into their applications using the provided software development kit.

In some examples, the video monetized video session service 101 may include a stream and media promoter 236 configured to promote certain monetized video session streams from registered advertisers 238, and rank the promoted monetized video session streams in the streams section of the information marketplace platform's user interface. In some examples, the stream and media promoter 236 may collect statistics associated the video streams, and the stream and media promoter 236 may use these statistics to price advertising or indicate effectiveness of promoted monetized video session streams. For example, the monetized video session metadata may include statistics about the number of participants, how long participants watched the monetized video session, and can include the number of signals of appreciation, the number of comments, the number of shares by participants, the average number of signals of appreciation per second, the average number of comments received per second (or ten seconds, etc.), the highest number of signals of appreciation received in a five second period, etc. In some examples, the statistics may include the area or location on which the signals of appreciation are being given. For example, the stream and media promotor 236 may collect statistics on which region of the screen the signals of appreciation were given, and if participants are "tapping" certain objects in the monetized video session. These types of statistics may provide insight into which action, product, or object participants are engaging with. In some examples, the stream and media promoter 236 may provide a visual representation of these statistics such as a graph, chart, etc. In some examples, the stream and media promoter 236 may use these statistics to automatically determine a level of effectiveness of a promoted stream. For example, if one or more of these metrics is above a threshold level, the stream and media promoter 236 may determine that the promoted stream has a relatively high effectiveness level.

Figure 7:
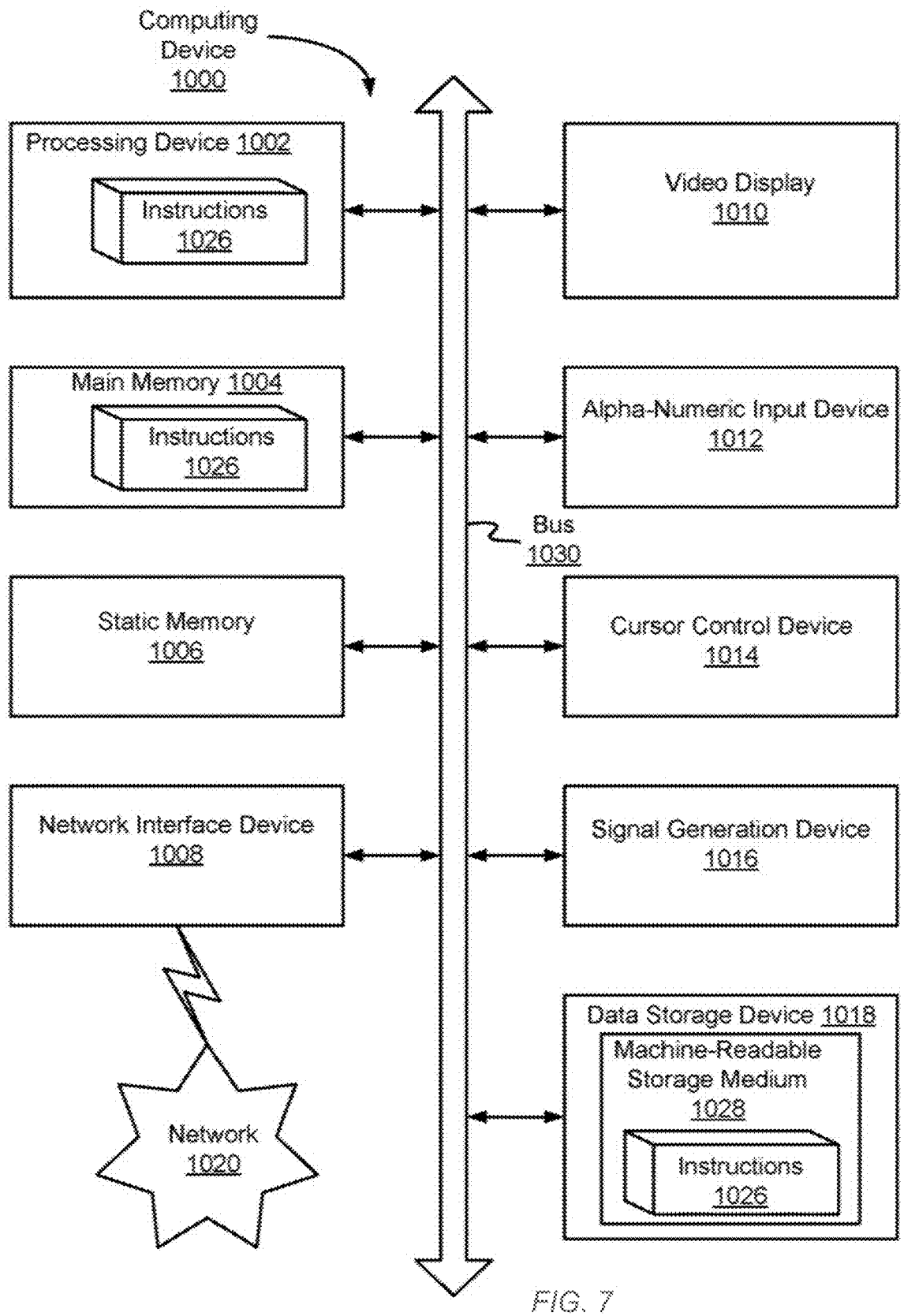
FIG. 7 illustrates a diagrammatic representation of a machine in the example form of a computing device within which a set of instructions, for causing the machine to perform any one or more of the methodologies discussed herein, may be executed.

FIG. 7 illustrates a diagrammatic representation of a machine in the example form of a computing device 1000 within which a set of instructions, for causing the machine to perform any one or more of the methodologies discussed herein, may be executed. The computing device 1000 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one example, the computing device 1000 may present an overlay UI to a user (as discussed above). In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 (e.g., instructions for an application ranking system) for performing the operations and steps discussed herein.

The computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker). In one example, the video display unit 1010, the alphanumeric input device 1012, and the cursor control device 1014 may be combined into a single component or device (e.g., an LCD touch screen).

The data storage device 1018 may include a computer-readable storage medium 1028 on which is stored one or more sets of instructions 1026(e.g., instructions for the application ranking system) embodying any one or more of the methodologies or functions described herein. The instructions 1026 may also reside, completely or at least partially, within the main memory 1004 and/or within the processing device 1002 during execution thereof by the computing device 1000, the main memory 1004 and the processing device 1002 also constituting computer-readable media. The instructions may further be transmitted or received over a network 1020 via the network interface device 1008.

While the computer-readable storage medium 1028 is shown in an example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an example" or "one embodiment" or "an example" or "one example" throughout is not intended to mean the same embodiment or example unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several examples of the present disclosure. It will be apparent to one skilled in the art, however, that at least some examples of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular examples may vary from these example details and still be contemplated to be within the scope of the present disclosure.

It is to be understood that the above description is intended to be illustrative and not restrictive. Many other examples will be apparent to those of skill in the art upon reading and understanding the above description. The scope of the disclosure should, therefore, be determined with reference to the appended claims, along with the full scope of equivalents to which such claims are entitled.

The invention claimed is:

1. An information marketplace system comprising:
two or more computing devices connected to one or more server through one or more networks;
a social media network service, wherein a user of the social media network service is associated with one or more users within the social media network;
a video monetization service operable to enable a user at a computing device to configure a paywall of a monetized video session at a first user interface of the computing device, and share a paywall to the one or more users within the social media network,
the paywall for the monetized video session is a second user interface accessible by one or more users within the social media network, enabling the one or more users to view content associated with the monetized video session; and
a moderator engine configured to enable configuration of the monetized video session and collate data for the paywall for the monetized video session, wherein the moderator engine includes a paywall engine configured to enable the user at the computing device to select a monetization model for the monetized video session,
the moderator engine enables the user at the computing device to upload content at the first user interface of the computing device to be displayed at the paywall of the monetized video session and configure admission threshold to the monetized video session,
the video monetization service is configured to attach a timestamp packet to at least a portion of the monetized video session enabling an association of an engagement with a particular time in the monetized video session.

2. The information marketplace system of claim 1, wherein the monetized video service includes a schedule engine configured to enable the user to establish a date and time of the monetized video session.

3. The information marketplace system of claim 1, wherein the paywall engine provides a subscription video on demand (SVOD) service configured to charge participants a subscription fee for access to a library of on-demand digital content or a series of real time monetized video sessions of the user.

4. The information marketplace system of claim 3, wherein the on-demand digital content includes non-fungible token (NFT) tagged digital content.

5. The information marketplace system of claim 1, wherein the paywall engine provides a transactional video on demand (TVOD) service configured to charge participants on a pay-per-view of on-demand digital content or a real-time monetized video session of the user.

6. The information marketplace system of claim 1, wherein the paywall engine is further configured to provide a white-label paywall and white-labeling invoicing to the user.

7. The information marketplace system of claim 1, wherein the paywall engine configured to provide multiple currency support.

8. The information marketplace system of claim 1, wherein the monetized video service includes a schedule engine configured to enable the user to configure promo codes, offer sales and other discounts.

9. The information marketplace system of claim 1, wherein the monetized video session service includes a schedule engine configured to enable the user to configure schedule pricing.

10. The information marketplace system of claim 9, the paywall displays a profile icon of the user, a number of participants who have satisfied a threshold value of the paywall, and a number of participants who may qualify for a promotion for the monetized video session.

11. The information marketplace system of claim 9, the paywall displays at least one identifier associated with the monetized video session and profile icons of other users who are attending the monetized video session.

12. The information marketplace system of claim 1, wherein the social media network service includes user submitted content displayed on a message board, user submitted content includes at least one of a digital image, a digital video, a link to the paywall of the monetized video session, and text content.

13. A method of operating an information marketplace system by a system provider, the method comprising:
providing a social media network service wherein a user is associated with one or more users within the social media network;
enabling the user at a computing device to configure a paywall of a monetized video session via a first user interface;
presenting a second user interface accessible by one or more users within the social media network to view content associated with the monetized video session;
utilizing a moderator engine to facilitate configuration of the monetized video session and collation of data for the paywall, wherein the moderator engine comprises a paywall engine to assist the user in selecting a monetization model for the session; and
enabling the user to upload content via the first user interface to be displayed at the paywall and to set an admission threshold for the monetized video session,
associating an engagement with a particular time in the monetized video session by attaching a timestamp packet to at least a portion of the monetized video session.

14. The method of claim 13, further comprising:
incorporating a schedule engine within the monetized video service to enable the user to set a date and time for the monetized video session.

15. The method of claim 13, wherein the paywall engine provides a subscription video on demand (SVOD) service to charge participants a subscription fee for accessing a library of on-demand digital content or a series of real-time monetized video sessions.

16. The method of claim 15, wherein the on-demand digital content includes a non-fungible token (NFT) tagged digital content.

17. The method of claim 13, wherein the paywall engine provides a transactional video on demand (TVOD) service to charge participants on a pay-per-view basis for on-demand digital content or a real-time monetized video session.

18. The method of claim 13, further comprising providing a white-label paywall and white-label invoicing to the user through the paywall engine.

19. The method of claim 13, wherein the paywall displays a profile icon of the user, a count of participants who have met the paywall's threshold value, and a count of participants eligible for a promotion for the monetized video session.

20. The method of claim 13, wherein the social media network service showcases user-submitted content on a message board, including digital images, digital videos, links to the paywall of the monetized video session, and text content.

* * * * *